United States Patent [19]

Hein

[11] Patent Number: 4,772,879
[45] Date of Patent: Sep. 20, 1988

[54] MOTION SENSING ALARM

[75] Inventor: Edward A. Hein, Aldergrove, Canada

[73] Assignees: Sydney Harrison; Reuben Rothstein; Dinah Kalynchuk, all of Canada

[21] Appl. No.: 944,828

[22] Filed: Dec. 22, 1986

[51] Int. Cl.[4] .................. G08B 13/14; G08B 13/02
[52] U.S. Cl. .......................... 340/571; 340/65; 340/527; 340/530; 340/566
[58] Field of Search .......... 340/63, 65, 571, 566, 340/527, 530, 541

[56] References Cited

U.S. PATENT DOCUMENTS

| | | | |
|---|---|---|---|
| 3,721,956 | 3/1973 | Hamann et al. | 340/65 |
| 3,828,338 | 8/1974 | Kato | 340/566 |
| 4,012,611 | 3/1977 | Petersen | 340/566 |
| 4,030,087 | 6/1977 | Ritchie et al. | 340/571 |
| 4,057,791 | 11/1977 | Bimmerle et al. | 340/65 |

Primary Examiner—Glen R. Swann, III
Attorney, Agent, or Firm—Beehler, Pavitt, Siegemund, Jagger, Martella & Dawes

[57] ABSTRACT

A motion sensing alarm is disclosed. It is comprised of a time delayed switching circuit connected between a supply circuit and an electronic logic circuit. A triggering circuit is connected between the switching circuit and a false triggering circuit and the electronic logic circuit. An alarm initiating circuit is connected between the electronic logic circuit and an alarm.

6 Claims, 2 Drawing Sheets

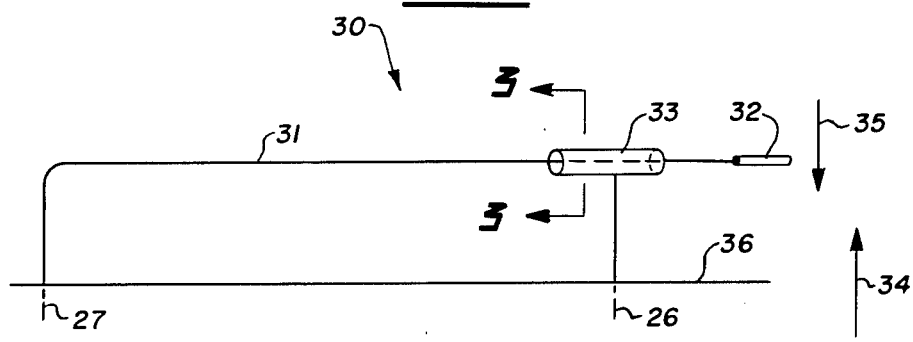

ic logic circuit means; triggering means connected between said switching means and false triggering circuit means and said electronic logic circuit means; alarm initiating circuit means connected between said electronic logic circuit means and alarm means.

MOTION SENSING ALARM

FIELD OF THE INVENTION

This invention relates to anti-theft alarms but more particularly to a motion sensing alarm.

DESCRIPTION OF THE PRIOR ART

Numerous motion sensing alarms have been developed for the purpose of deterring theft of bicycles, cars and the like. The most often used approach in providing a motion sensor is the use of a mercury switch or other similar device sensitive to motion and which will close a contact to activate the alarm when motion is detected. U.S. Pat. Nos. 3,975,645; 4,358,750; 4,359,717; and 4,379,281 disclose bicycle alarms and the like using the aforementioned sensors.

One of the problems associated with these motion detectors is their reliance on gravity to permit contact to be made when the sensor is tilted or moved like in say a bicycle alarm. In some instances this cannot always be an effective deterrent since the object or bicycle can be transported in the upright or rested position to prevent the contact to be made.

Also, although numerous motion sensing alarms have been produced with an intent of reducing the physical size of the alarm itself, the resultant mechanical and electronic circuitry was found to be complex and more expensive to manufacture.

There therefore exists a requirement for a fool-proof motion sensing alarm which can detect any type of motion and is not affected by gravity or positioning of the alarm and which is made of fairly simple electronic circuitry.

SUMMARY OF THE INVENTION

Accordingly, the present invention discloses a motion sensing alarm, comprising: time-delay switching means connected between supply means and an electronic logic circuit means; triggering means connected between said switching means and false triggering circuit means and said electronic logic circuit means; alarm initiating circuit means connected between said electronic logic circuit means and alarm means.

DRAWINGS

Particular embodiments of the invention will be understood in conjunction with the accompanying drawings in which:

FIG. 2 is an illustrative view of the motion sensor used in the present invention; and FIG. 3 is a section taken along line 3—3 of FIG. 2.

DESCRIPTION OF THE PREFERRED EMBODIMENTS

Figure 1:
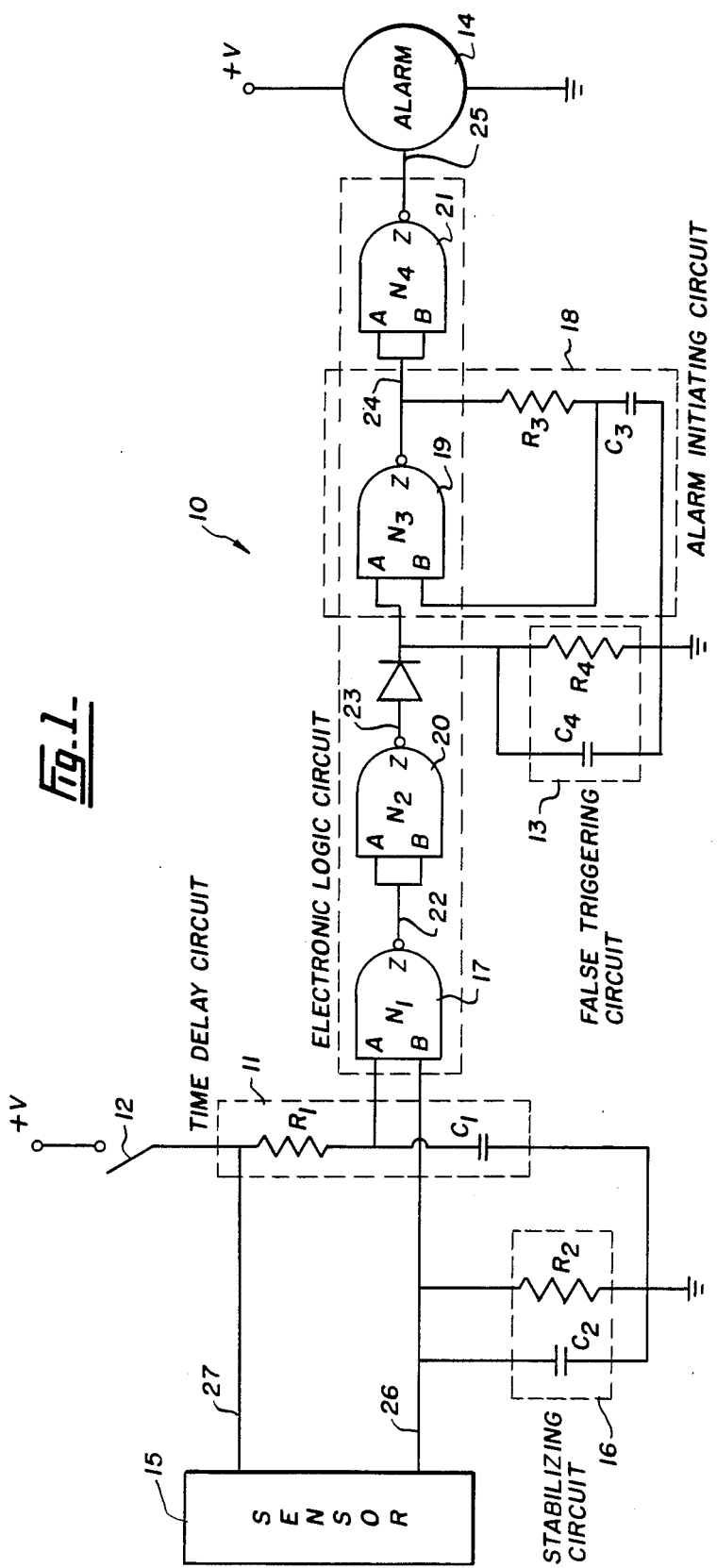
FIG. 1 is a schematic of the motion sensing alarm of the present invention.

Referring now to FIG. 1 we have shown at reference numeral 10 a schematic of the basic components that form part of the motion sensing alarm of the present invention. It includes an initial time delay circuit 11 to prevent the sounding off of the alarm when switch 12 is manually activated. A time delayed false triggering circuit 13 is used to delay the turn off of alarm 14 when sensor 15 no longer detects motion. Circuit 16 is used to eliminate the on-off switching effect sensor 15 would have on logic gate 17 when sensor 15 detects motion. Circuit 18 in conjunction with gate 19 forms a gated low frequency multi-vibrator to pulse alarm 14 when sensor 15 first detects motion.

As can be seen the main components of the alarm system of the present invention are comprised of simple logic NAND gates 17, 19, 20 and 21 and resistor capacitor combinations depicted by circuits 11, 13, 16 and 18.

The truth table used for the NAND gates is as follows:

| TRUTH TABLE NAND GATE | | |
|---|---|---|
| A | B | Z |
| 0 | 0 | 1 |
| 1 | 0 | 1 |
| 0 | 1 | 1 |
| 1 | 1 | 0 |

As indicated previously, circuit 11 is used as a time delay when the alarm is first armed by closing switch 12. It consists of resistor $R_1$, connected in series with capacitor $C_1$, between switch 12 and ground. The circuit is used to prevent the accidental triggering of the alarm since switch 12 can either be closed manually by means of a standard switch or through the use of a lock and key assembly. Sensor 15 is so sensitive that the mere handling of the alarm housing would set off the alarm once the switch is turned on.

Upon closing switch 12, a few seconds will be required before capacitor C1 becomes charged and input A of NAND gate 17 changes from a low state to a high state.

When the alarm is armed and at rest, input A of NAND gate 17 is high whereas input B is in the low state. Accordingly, as depicted in the truth table the gate's output 22 will be in the high state. Since both inputs of gate 20 are connected together and to output 22 of gate 17, NAND gate 20 acts as an inverter and accordingly output 23 of gate 20 will be in the low state when output 22 of gate 17 is in the high state. This is also depicted in the truth table shown above. With input A of gate 19 in the low state and input B in the high state, output 24 of gate 19 will be in the high state. Since gate 21 is also connected as an inverter, its output 25 will be in the low state and hence alarm 14 will be off.

In the event the object, to which the alarm is secured, is moved or accidentally touched, sensor 15 will trigger for a short duration and activate the alarm 14. Since a time delay is built in, alarm 14 will stay activated until capacitor C2 and C4 of circuits 16 and 13 respectively are fully discharged. During the temporary triggering of sensor 15, voltage at output 26 of sensor 15 will charge capacitor C2. Input B of gate 17 will also be in the high state. Since both input A and B are in the high state, output 22 will change from a high state to a low state and output 23 of gate 20 will change from a low state to a high state. Since input B of gate 19 is already in the high state and input A changes to a high state as well, output 24 will become low and output 25 of gate 21 will change to a high state thereby activating alarm 14.

Input B of gate 17 will remain in the high state until capacitor C2 in circuit 16 has fully discharged through resistor R2.

Similarly, input A of gate 19 will remain in the high state until capacitor C4 of circuit 13 has fully discharged through resistor R4. Input B of gate 19 will remain in the low state until the time input A changes to a low state as well. Hence, after a predetermined amount of time, capacitor C2 and C4 will become fully discharged to deactivate alarm 14.

If the object or the alarm is moved or if sensor 15 detects motion for a longer period of time, for example if the object is being carried away, alarm 14 will be continuously activated. Since the electrical contact within sensor 15 will continuously open and close as it is vibrated, circuit 16 and especially capacitor C2 will help maintain a relatively constant voltage at input B of gate 17 since capacitor C2 will charge and discharge as contact is made and disconnected thereby keeping input B of gate 17 in the high state.

In FIG. 2, we have shown the vibration sensor used in the present invention. The sensor depicted by reference numeral 30 is comprised of a thin metallic wire 31 having enough rigidity to support a weight 32 at its distal end and such as to remain at the centre of a cylindrical contact element 33, as shown in FIG. 3. It will remain in that position no matter what the orientation of the alarm is with respect to the pull of gravity. On the other hand, wire 31 is flexible enough such that any vibration caused upon the alarm will result in contact to be made between wire 31 and contact element 33.

Wire 31 is fixed to mounting board 36 and connected to the output of switch 12. Contact element 33 is also fixed to mounting board 36 and is connected to input B of gate 17 as well as to circuit 16.

Because of its inertial weight, weight 32 at the distal end of wire 31 will move in an opposite direction to any force submitted to mounting board 36.

For example, the vertical motion of the alarm, depicted by arrow 34, will result in the flexing of wire 31 caused by the inertia of weight 32. Hence weight 32 will move downwardly as depicted by arrow 35 relative to the motion of mounting board 36 such that wire 31 makes contact with contact element 33.

I claim:
1. A motion sensing alarm, comprising:
time delayed circuit means connected between a supply means via a switch and a first input of said electronic logic circuit means;
sensor means comprising a thin metallic wire having a weight at its distal end, said wire being disposed in a generally central position within a contact making element until motion is detected, said wire being connected between said switch and said time delay circuit means and said contact making element being connected to a second input of said electronic logic circuit means;
alarm initiating circuit means connected to said electronic logic circuit means;
false triggering circuit connected between said electronic logic circuit means and said alarm initiating circuit means; and
alarm means connected at the output of said electronic logic circuit means.

2. A motion sensing alarm as defined in claim 1 wherein said electronic logic circuit means comprises a first NAND gate having a first and a second input and having an output connected to inputs of a second NAND gate, said second NAND gate being connected to said flase triggering circuit means and a first input of a third NAND gate via a diode, said third NAND gate having a resistor connected between its output and its second input and a capacitor connecting said resistor to ground so as to form said alarm initiating circuit means, the output of said third NAND gate being connected being connected to the input of a fourth NAND gate with its output connected to said alarm means.

3. A motion sensing alarm as defined in claim 2 further comprising stabilizing circuit means connected between said contact making element and ground.

4. A motion sensing alarm as defined in claim 3 wherein said stabilizing circuit means comprises a resistor connected in parallel with a capacitor.

5. A motion sensing alarm as defined in claim 4 wherein said time delay circuit means comprises a resistor connected in series with a capacitor.

6. A motion sensing alarm as defined in claim 5 wherein said alarm means comprises a buzzer connected between the output of said fourth NAND gate and ground.

* * * * *